United States Patent [19]
Piper et al.

[11] Patent Number: 5,643,349
[45] Date of Patent: Jul. 1, 1997

[54] APPARATUS FOR APPLYING SO₃ TO FLOAT GLASS

[75] Inventors: Mark Piper, Boyceville; Al Slavich, Menomonie; Chris Granley, Colfax, all of Wis.; Roger O'Shaughnessy, Chaska, Minn.

[73] Assignee: Cardinal IG Company, Minnetonka, Minn.

[21] Appl. No.: 395,280

[22] Filed: Feb. 27, 1995

Related U.S. Application Data

[63] Continuation of Ser. No. 109,543, Aug. 19, 1993, abandoned.

[51] Int. Cl.⁶ .......................... C03B 18/02; C03C 17/00
[52] U.S. Cl. .......................... 65/157; 65/182.1; 65/99.2; 65/60.5
[58] Field of Search .................... 65/30.1, 30.13, 65/99.2, 99.4, 111, 157, 182.1, 182.3, 60.5, 60.51, 60.53; 427/161, 162, 163.1, 165, 166, 168, 255; 118/718, 720

[56] References Cited

U.S. PATENT DOCUMENTS

| | | |
|---|---|---|
| 3,199,966 | 8/1965 | O'Connel et al. . |
| 3,451,796 | 6/1969 | Mochel . |
| 3,473,908 | 10/1969 | Snow . |
| 3,632,322 | 1/1972 | Loukes . |
| 3,653,864 | 4/1972 | Rothermel et al. . |
| 3,951,633 | 4/1976 | Danihel ......................... 65/99.4 |
| 4,019,887 | 4/1977 | Kirkbride et al. ................. 65/30.1 |
| 4,026,692 | 5/1977 | Bartholomew . |
| 4,107,388 | 8/1978 | Gambaretto et al. . |
| 4,236,906 | 12/1980 | Hummel . |
| 4,328,305 | 5/1982 | Rauscher . |
| 4,340,408 | 7/1982 | McMillan et al. . |
| 4,422,404 | 12/1983 | Harcuba . |
| 4,427,488 | 1/1984 | Servais et al. . |
| 4,518,222 | 5/1985 | Borrelli et al. . |
| 4,624,729 | 11/1986 | Bresciani et al. . |
| 4,636,439 | 1/1987 | Breininger . |

FOREIGN PATENT DOCUMENTS

| | | |
|---|---|---|
| 2515633 | 5/1983 | France . |
| 294391 | 7/1928 | United Kingdom . |
| 835820 | 5/1960 | United Kingdom . |
| 1182546 | 2/1970 | United Kingdom . |
| 1282866 | 7/1972 | United Kingdom . |
| 2199318 | 7/1988 | United Kingdom . |

OTHER PUBLICATIONS

Patent Abstracts of Japan, vol. 6, No. 227 (R–13d[1105], 12 Nov. 1982; JP–A–57 129845, Ookura, N.

Chemical Abstracts, vol. 91, No. 16, Oct. 1979, p. 280, 127849t; JP–A–79 040 816, Wakai, N.

Mochel, E.L., et al., "Strengthening of Glass Suraces ...", J. Am. Ceramic Soc., vol. 49, No. 11, 21 Nov. 1966, pp. 585–589.

Adams and Walters, "Chemical Durability", from Glass Technology, pp. 3–1 –3–5.

Article from The Properties of Glass Surfaces, Surface Chemistry and Corrosion of Glass, pp. 163–165.

*Primary Examiner*—Donald E. Czaja
*Assistant Examiner*—Steven P. Griffin
*Attorney, Agent, or Firm*—Fredrikson & Byron, PA

[57] ABSTRACT

The present invention provides a method for making a stain-resistant float glass and an apparatus for carrying out such a method. In keeping with this method, $SO_3$ is applied to the upper surface of float glass in an amount efficacious to materially reduce staining of the upper surface of the glass. Optimally, $SO_3$ gas can be applied directly onto the upper surface of the glass. An apparatus of the invention generally includes a downwardly open hood positioned above the upper surface of the glass and having walls defining an enclosure. $SO_3$ gas (either as such or as a reactive mixture of $SO_2$ gas and an oxygen-containing gas) is delivered through a delivery tube to the enclosure.

7 Claims, 3 Drawing Sheets

APPARATUS FOR APPLYING SO₃ TO FLOAT GLASS

This application is a continuation of application Ser. No. 08/109,543, filed Aug. 19, 1993, now abandoned.

FIELD OF THE INVENTION

The present invention pertains to the manufacture of glass and has particular utility in manufacturing a stain-resistant float glass.

BACKGROUND OF THE INVENTION

Glass for windows and automobile windshields or the like should be clear and substantially free from significant surface imperfections which could interfere with the transmission of light or affect the appearance of the glass. One defect in glass which can render the glass unacceptable for such applications is the presence of a slight haze or discoloration on a surface of the glass. Surface hazing which occurs at normal handling temperatures (as opposed to hazes which develop at high temperatures during tempering or annealing operations) is referred to herein as "staining".

Staining is a major problem in the glass industry. Although panes of glass which exhibit some staining may be acceptable for some applications, in most circumstances any appreciable staining can render the glass virtually useless. For example, window units and windshields are frequently provided with heat-reflective metal/metal oxide coatings. When such a coating is applied to a glass surface exhibiting stain, the resultant coated article has a hazy, uneven appearance which can render the coated glass unsalable.

Although one may postulate possible chemical processes by which staining occurs, the exact mechanism of staining of glass surfaces is not understood. There appears to be a relationship between humidity and staining. Glass manufactured and stored in a hot, humid environment where the ambient air has a high moisture content is more likely to show staining than glass manufactured on a drier day or stored in a drier climate. Accordingly, staining may perhaps be attributable in part to the effect of moisture on glass surfaces. However, the precise mechanism of staining does not appear to have been satisfactorily determined.

Virtually all of the glass being manufactured today for use in windows and the like is float glass. The float glass manufacturing process is well known. Briefly, molten glass is deposited on a bath of molten tin which may include some minor additions of other metals. The molten glass is drawn across the tin bath in a ribbon by pulling on the glass ribbon as it exits the tin bath and enters a cooling or annealing area. The surface tension of the glass on the molten tin produces a smooth finish on the glass which was obtainable in prior methods only via extensive grinding and polishing. As the glass cools on the tin bath, the underside of the glass is in direct contact with the tin and it is believed that some tin becomes incorporated in the bottom surface of the glass.

The temperature in the tin bath is profiled along its length so that the glass will cool and harden somewhat as it traverses the bath. When the glass reaches the end of the tin bath it needs to be stiff enough to be handled as a continuous ribbon, yet it must be soft enough to permit it to be lifted up over a lip of the tin bath and onto rollers for conveyance through an annealing lehr. The glass is cooled in the annealing lehr in a controlled fashion to avoid undesirable thermal stresses in the glass. During the treatment of the glass ribbon in the annealing lehr it is passed over a series of rollers which support the underside of the ribbon.

As noted above, when the glass first leaves the tin bath and enters the annealing lehr, it must be soft enough to permit it to be lifted up over the lip of the tin bath. This relatively soft glass then rests on a series of rollers as it is transported through the annealing lehr. Any surface imperfections in these rollers can lead to a marred surface if the glass remains untreated. In most applications, though, a smooth finish on the glass is needed. Also, when the glass is relatively soft it can tend to stick to the surfaces of the rollers, further marring the finish of the glass.

Due to imperfections in the undersurface of float glass resulting from roller contact, metal/metal oxide coatings of the type commonly used in heat reflective windows and windshields are applied preferentially to the upper surface of the glass, i.e. that surface which was not in contact with the rollers during manufacture of the glass sheets. Such metal oxide coatings are generally known to the art and may be applied, for example, by magnetron sputtering techniques. When a particular batch of glass is found to exhibit excessive staining, some commercial manufacturers have tried to ameliorate this problem by applying metal oxide coatings to the underside of the glass which had been in contact with the rollers.

When the undersurface of the float glass is coated with a metal/metal oxide coating in this manner, it has been found that the undersurface virtually never exhibits staining. It has heretofore been believed that the incorporation of tin in this undersurface, resulting from contact with the molten tin bath, was responsible for the lack of staining. Although underside coating may provide a temporary solution in a production situation where better glass is not available when needed, surface imperfections in the glass surface due to contact with the rollers make coating the underside of the glass on a consistent commercial basis impractical.

U.S. Pat. No. 3,199,966 (the teachings of which are incorporated herein by reference), issued to O'Connell et al, suggests a method which has gained wide-spread acceptance in the art for reducing surface imperfections resulting from contact with the rollers. In this method, sulfur trioxide ($SO_3$) is applied to the undersurface of the glass before it comes into contact with the rollers. O'Connell et al explain that the application of $SO_3$ to the bottom of the glass ribbon provides a lubricious coating between the glass and the rollers, allowing the glass to move over the rollers without creating as many surface imperfections due to contact with the rollers. Additionally, O'Connell et al state that the $SO_3$ reacts with sodium oxide ($Na_2O$) in the glass surface to form sodium sulfate ($Na_2SO_4$) and that some of this salt is transferred to the rollers, providing a smoother, more uniform surface on the rollers.

Although the process of O'Connell et al has been found to reduce the surface imperfections attributable to contact with the rollers in the annealing lehr, it does not completely eliminate such flaws. The presence of these mechanically generated surface flaws still makes the application of metal/metal oxide coatings to the undersurface of the glass a commercially impractical means of reducing staining losses on a regular basis because the resultant coated articles are likely fraught with visible imperfections. In high quality window products, such imperfections are not commercially acceptable and coated glass exhibiting such flaws is generally deemed to be unacceptable for commercial sale.

Snow, U.S. Pat. No. 3,473,908 (the teachings of which are incorporated herein by reference) outlines an additional advantage of applying $SO_3$ to the underside of the glass. Snow explains that float glass tends to develop a "white, iridescent haze" when it is heated above temperatures of about 1000° F. for purposes of tempering or reshaping (e.g. to form a windshield from flat float glass). Snow attributes this haze to the conversion of stannous oxide to stannic oxide on the glass undersurface that was in contact with molten tin. Snow surmises that the reaction of $SO_3$ with sodium oxide in the glass undersurface ties the tin more intimately to the glass network, preventing the stannous oxide from converting to stannic oxide.

Attempts also have been made to reduce staining of the upper side of sheets of float glass. As noted above, the superior stain resistance of the underside of the glass was believed to be due to the intimate contact between the molten tin and the glass surface in the tin bath and a resulting incorporation of tin oxide into the glass surface. No practical means for bringing the upper surface of the glass into contact with molten tin (at least without applying a visible layer of tin or tin oxide to the glass surface) appears to have been developed. Hence, glass manufacturers have had to look to other solutions to reduce stain.

One may attempt to get around this problem by altering the composition of the glass. Ordinary float glass used for windows and the like is most commonly "soda-lime glass". Such glass includes primarily silica (from sand), sodium oxide (usually from soda ash) and calcium oxide (usually from limestone). Minor additions of other constituents may be added to achieve different properties, such as to color the glass.

In order to reduce staining, some manufacturers have added other materials to the glass for the purpose of reducing the susceptibility of the glass to moisture or chemical attack; alumina is one common material added for this purpose. Many such additives, including alumina, tend to be more expensive as raw materials than the common constituents of soda-lime glass and also tend to melt at notably higher temperatures, increasing the cost of melting and making the glass.

Others have attempted to reduce staining of the glass upper surface by treating the upper surface with acids. The most common acid treatment for glass surfaces involves the, application of a powdered adipic acid to the glass at the end of the annealing process. Others have applied adipic acid or maleic acid in aqueous form on the glass. When the glass is washed before applying heat-reflective films, these water-soluble acids are generally washed away as well. Much research and development effort has been devoted to developing specific acid compositions and methods of application to combat staining. The specific acid treatments which are developed are frequently treated as trade secrets by the manufacturers.

Modifying the composition of the glass and applying various acids to the surface does tend to reduce staining, but does not eliminate it. Despite the well recognized problem of staining and the massive attempts by glass manufacturers to eliminate this costly problem, to date there do not appear to be any manufacturers capable of producing competitively priced soda-lime float glass with an upper surface which even begins to rival the stain resistance of the bottom surface which had been in contact with the molten tin.

SUMMARY OF THE INVENTION

The present invention provides a glass which exhibits superior stain resistance and a method for forming such glass. In accordance with the present invention, sulfur trioxide gas is applied to the upper surface of a float glass ribbon, i.e. that surface of the glass which has not been in contact with the tin in the tin bath. The $SO_3$ is applied at a rate sufficient to result in substantial reduction or elimination of upper surface staining and commonly results in the formation of a white, cloudy film on the upper surface of the glass that is readily washed away. In a preferred embodiment, a combination of $SO_2$ gas and oxygen is provided to a sparge pipe disposed above the glass ribbon at a location in the annealing lehr wherein the temperature is hot enough to promote the conversion of the $SO_2$ and oxygen to $SO_3$.

The present invention also provides an apparatus for coating the upper surface of the glass with the $SO_3$ gas. In accordance with this embodiment of the invention, a sparge pipe is disposed above the glass ribbon in the annealing lehr. A hood is provided around the sparge pipe and extends downwardly to a position adjacent the upper surface of the glass to substantially enclose the $SO_3$ supply and maintain a relatively high concentration of the gas adjacent the glass surface as it passes beneath the hood.

DETAILED DESCRIPTION

Figure 1:
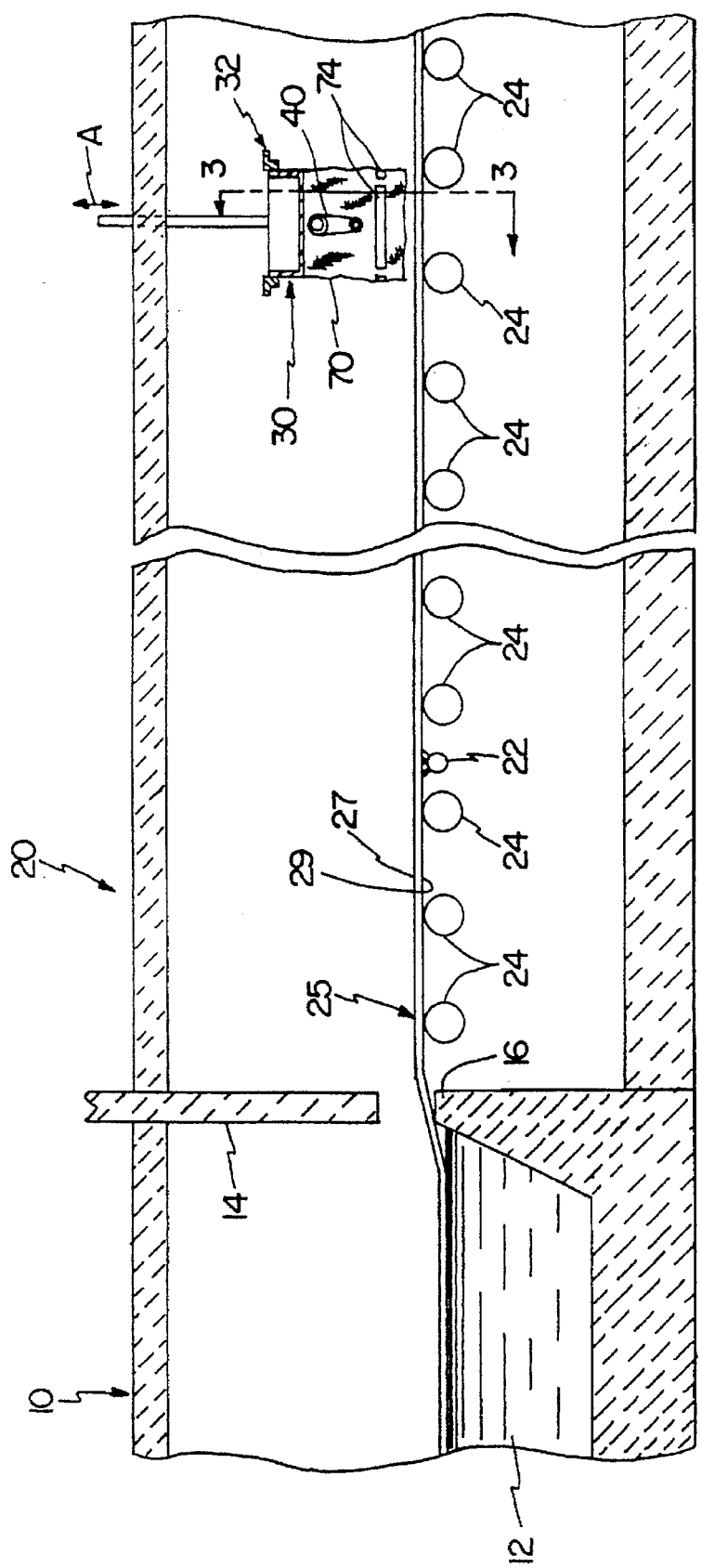
FIG. 1 is a schematic cross sectional view of a portion of a float glass line in accordance with the invention.

FIG. 1 is a schematic cross sectional illustration of a portion of a float glass line. As noted above, molten glass from a melting furnace (not shown) is allowed to flow onto a bath of molten tin 12 in the tin bath 10. By the time the glass 25 reaches the end of the tin bath 10, it should be cooled sufficiently to allow the glass to be lifted up over the lip 16 at the end of the tin bath and onto a roller 24 of the annealing lehr 20. The tin bath will generally include a vertically adjustable end wall 14 to maintain a controllable degree of thermal isolation between the tin bath and the lehr 20.

The glass 25 cools as it traverses along the annealing lehr 20. The temperature in the annealing lehr is profiled so that the temperature decreases along its length from an initial high temperature (e.g. about 630° C. (1165° F.)) to a final lower temperature (e.g. about 70° C. (160° F.)). This temperature profile is selected and maintained to control the rate at which the glass cools to avoid, or at least controllably limit, permanent thermal stresses in the glass. As the glass traverses the lehr 20, it rides along the rollers 24. Some of these rollers may simply be idler rollers upon which the glass rests while other rollers will be driven by a motor or the like to draw the glass out of the tin bath 10 and along the lehr, but in a preferred embodiment all of the rollers are motor driven to maintain a substantially constant urging force along the length of the glass.

As noted above, it is common practice in the art to coat the underside 29 of the glass, i.e. the lower surface of the glass which is in contact with the rollers 24, with $SO_3$ gas. This is commonly done shortly after the glass is lifted off the tin bath in order to avoid contact with too many rollers before the beneficial $SO_3$ coating is applied. $SO_3$ is usually supplied with an elongate pipe 22 positioned beneath the glass and having a plurality of small holes spaced along its length.

Adipic acid, maleic acid, or some combination of these or other acids may also be applied to the top surface 27 of the glass after it has cooled sufficiently to avoid thermal degradation of these organic acids. A separate apparatus (not shown) for applying these acids is usually located at the end of the cooling process, i.e. after the glass exits the cool end of the lehr 20. Although these acids are not very caustic, they nonetheless represent a significant problem because they can corrode the applicators and can be difficult for operators to handle.

In accordance with the present invention, a coating of $SO_3$ is applied to the upper surface 27 of the glass ribbon as it moves through the lehr. This may be accomplished in any desired fashion which will ensure that an efficacious amount of sulfur trioxide is applied to the upper surface of the glass. Although the minimum amount of $SO_3$ to achieve an acceptable degree of stain resistance has not been determined, a flow rate of $SO_3$ to the glass surface of about 3.5 mg $SO_3$ per square foot of glass is anticipated to work well.

$SO_3$ gas can be applied to the glass ribbon by actually supplying the gas to a tube or the like, such as the supply apparatus 40 described below. However, in a preferred embodiment, a combination of $SO_2$ gas and a an oxygen-containing gas is supplied to the supply tube 40. Although pure oxygen could be used as the oxygen-containing gas, the $SO_2$ may instead simply be mixed with air either prior to introduction to the supply system or by simply allowing the $SO_2$ gas to mix with the ambient air within the annealing lehr.

Others have suggested that sulfur dioxide reacts with oxygen at temperatures of 800° F. or more to form sulfur trioxide ($SO_3$). For instance, O'Connell et al (noted above) teach that $SO_2$ gas can be mixed with air or oxygen and passed through a metal pipe. At elevated temperatures, which O'Connell et al state should be at least 800° F., the $SO_2$ gas is oxidized to $SO_3$, with the metal of the pipe acting as a catalyst for this reaction.

Figure 2:
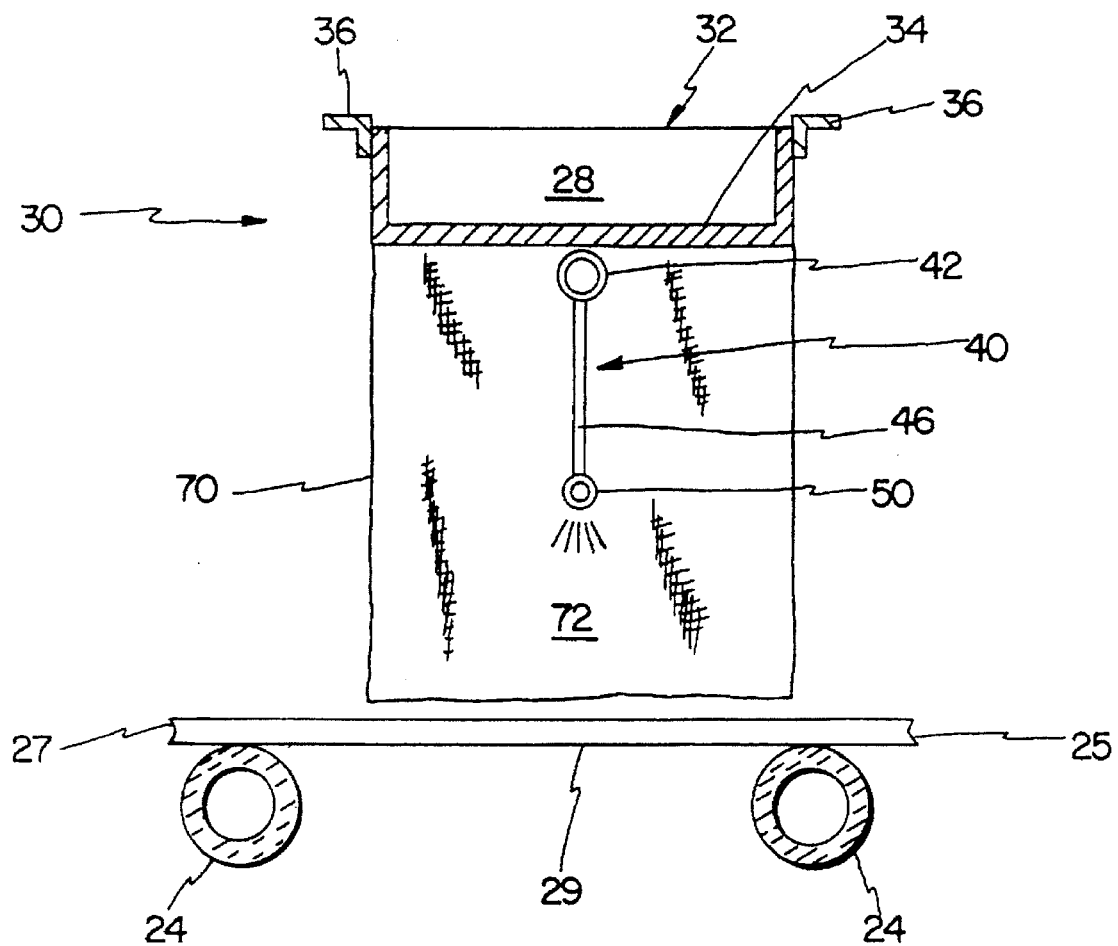
FIG. 2 is an end view of a $SO_3$ coating apparatus of the invention adjacent a glass surface.
Figure 3:
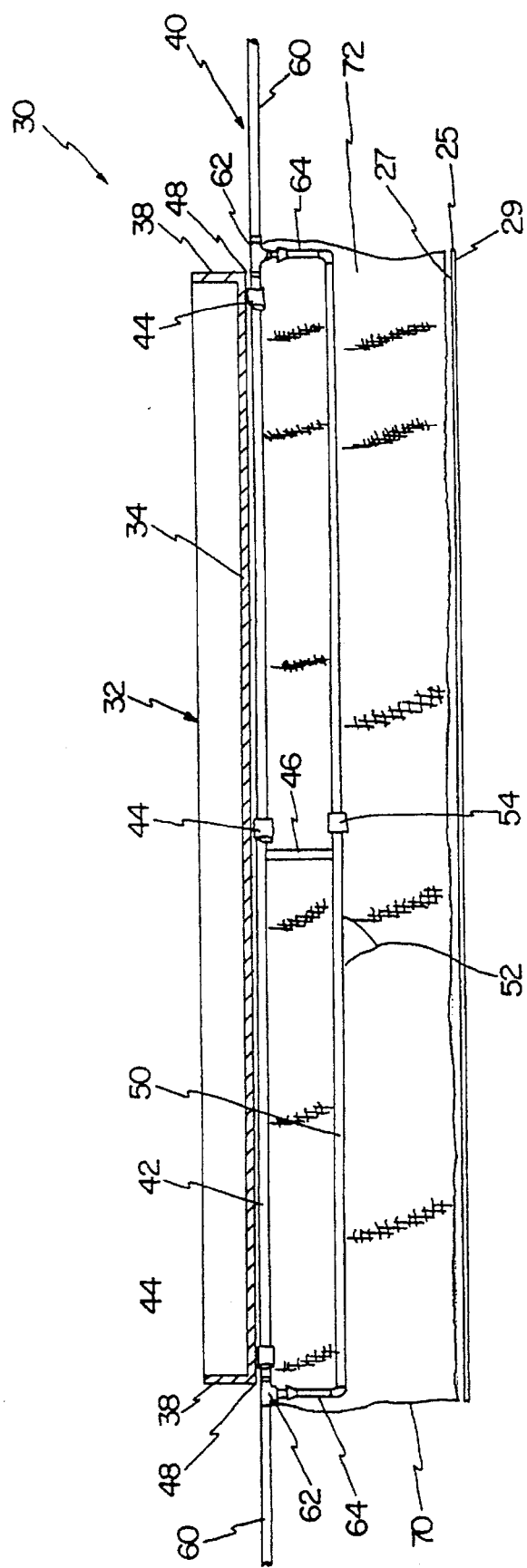
FIG. 3 is a side view of the apparatus of FIG. 2 taken along the line 3—3 of FIG. 1.

FIGS. 1–3 depict an $SO_3$ hood 30 which has been found useful for applying $SO_3$ to the upper surface 27 of the glass in accordance with the invention. The hood 30 includes a support frame 32, an $SO_3$ supply system 40 and an enclosure 70. The frame in the embodiment shown in FIGS. 1–3 includes a generally rectangular plate 34 and a peripheral upstanding wall 38 which desirably extends upwardly from the peripheral edge of the plate 34. As best seen in FIGS. 2 and 3, the plate 34 generally defines the overall shape of the hood and should be approximately as wide as the glass ribbon 25 which is to be treated. Although the plate 34 could have virtually any desired shape, a rectangular shape was chosen, as this will help define an interior space 72 of a generally uniform length across the width of the glass ribbon 25. This uniform length helps ensure a fairly uniform application of $SO_3$ across the width of the glass ribbon.

The frame 32 may also be provided with means for mounting the hood within the annealing lehr. In the embodiment depicted, mounting flanges 36 extend along the upper edges of the long sides of the peripheral wall 38. These mounting flanges 36 are typified as L-shaped angle brackets.

The frame 32 should be made of a material which is capable of withstanding prolonged use in the annealing lehr and should be capable of withstanding temperatures in the neighborhood of about 600°–650° C. (about 1100°–1200° F.). A metal such as 316 stainless steel has been found to work well.

An $SO_3$ supply system is attached to the frame 32 and depends downwardly therefrom. The $SO_3$ supply system can be of any suitable construction that provides a relatively uniform concentration of $SO_3$ within the interior space 72 of the hood 30. For instance, the supply system may constitute a single elongate pipe having a series of holes spaced along its length, such as the $SO_3$ delivery pipe (22 in FIG. 1) commonly used to apply $SO_3$ to the underside 29 of the glass.

FIGS. 2 and 3 depict a particularly useful embodiment of the supply system 40, though. In this embodiment, the supply system includes a mounting shaft 42 which supports a sparge pipe 50 and serves to connect the sparge pipe to the frame 32. The mounting shaft 42 may be attached to the frame in any desired fashion. In the preferred embodiment shown in the drawings, though, the mounting shaft 42 is rotatably attached to the frame by means of a plurality of cuffs 44. The cuffs 44 are secured to the underside of the plate 34 on the frame in a permanent fashion, such as by welding. The mounting shaft 42 is relatively loosely received within these generally tubular cuffs so that it is permitted to rotate with respect to the cuffs. In this manner, the mounting shaft 42 can be pivoted with respect to the frame, which permits the $SO_3$ supply system 40 to be pivoted out of the way as described more fully below.

As noted below, the mounting shaft 42 shown in the drawings is not designed to have $SO_3$ gas pass therethrough. Accordingly, the mounting shaft may be a substantially solid rod of stainless steel or the like. If the mounting shaft 42 is formed of a hollow pipe rather than a heavier solid rod, it is preferred that the ends of the mounting shaft which are attached to the sparge pipe system be welded closed in order to prevent any $SO_3$ from entering the shaft 42.

The sparge pipe 50 is desirably spaced away from the mounting shaft 42 and depends downwardly therefrom. The sparge pipe is adapted to be positioned relatively closely to the upper surface 27 of the glass. The underside of the sparge pipe includes a plurality of outlets 52 spaced relatively evenly along its length for delivering $SO_3$ gas downwardly toward the upper surface of the glass. The size and number of these outlets can be varied as desired in order to achieve a relatively uniform application of $SO_3$ on the upper surface of the glass.

It has been found that holes having a diameter of approximately $1/16$ of an inch spaced at intervals between about one inch and about two inches along the length of the sparge pipe will yield satisfactory results. In one useful embodiment, the holes are spaced at about two-inch intervals adjacent the outer edges of the sparge pipe, with about one-inch intervals along about the middle six feet of the pipe.

As will be explained more fully below, the sparge pipe 50 preferably is supplied with gas from both ends. If so desired, a single, elongate length of pipe may be used. However, in order to ensure more even distribution of the gasses, the embodiment shown includes a central weld 54 dividing the sparge pipe 50 into two equal lengths. Each of these lengths is provided with a separate gas supply. This has been found to yield a more even distribution of $SO_3$ within the interior space 72 then would be achieved with a single elongate pipe. If a single elongate pipe were used, there would be a greater pressure drop along the length of the pipe between the supply end and the distal end of the pipe. This central weld 54 can be formed, for instance, by providing two separate lengths of pipe and welding their two ends together in a solid weld in order to block the flow of gasses between the two lengths of pipe. Of course, other means for promoting uniform distribution of the gas to the upper surface of the glass can be used. For example, one may control gas flow rates across the width of the glass ribbon by controlling the size or spacing of the outlets 52.

In the embodiment shown in FIG. 3 the gas supply tubes 60 are physically attached to the mounting shaft 42. One gas supply tube is attached to either end of the mounting shaft with the axes of the gas supply tubes substantially coinciding with the axis of the mounting shaft. The gas supply tubes 60 should be long enough to extend outwardly through the walls of the annealing lehr (not shown) to permit ready access to the gas supply tubes by the operators. By attaching the gas supply tubes to the mounting shaft in the manner shown in FIG. 3, the entire $SO_3$ supply system 40 can be pivoted about the mounting shaft 42 simply by turning the portions of the gas supply tubes extending outwardly of the annealing lehr, as described below.

The gas supply tubes 60 are in gas communication with the sparge pipe 50. In the embodiment shown, the gas supply tube 60 is attached to the mounting shaft by means of a standard tee joint 62. If the mounting shaft 42 is a hollow pipe as illustrated in FIGS. 1 and 2, the ends 48 of the mounting shaft should be sealed, such as by welding the pipe of the mounting shaft closed.

A connection pipe 64 extends downwardly from each of the tee joints 62, with one connection pipe being attached to either end of the sparge pipe 50. Gas entering through the supply tubes 60 will pass through the tee joint, downwardly through the connection pipe into the sparge pipe 50. The length of the connection pipes 64 should be selected to permit the sparge pipe 50 to be positioned relatively closely to the upper surface 27 of the glass ribbon. A distance between the sparge pipe and the glass surface of about six inches (about 15 cm) has been found to work well.

If so desired, one or more cross-braces 46 may also be used to connect the sparge pipe to the mounting shaft 42. In the embodiment shown, only a single cross-brace is utilized, with the brace being positioned about midway along each of the mounting shaft and the sparge pipe. This cross-brace provides additional structural support to the $SO_3$ supply system 40. The cross-brace is not designed to permit $SO_3$ gas to pass from the sparge pipe to the mounting shaft, so the brace may be formed of a solid piece of stainless steel or the like.

As noted above, the sparge pipe 50 is positioned relatively close to the upper surface 27 of the glass ribbon 25. In normal operating circumstances, this should not present any significant problem because sufficient clearance is left between the sparge pipe and the glass surface to account for variations in glass thickness encountered in normal operation. If there is a manufacturing problem, though, it may be necessary to move the sparge pipe upwardly away from the glass to provide additional clearance. If so desired, the entire $SO_3$ hood 30 can be attached to the enclosure of the annealing lehr so that its height can be adjusted, as schematically depicted by arrow A in FIG. 1.

In the embodiment shown in FIGS. 2 and 3, though, it is not necessary to make the height of the entire $SO_3$ hood adjustable in order to adjust the clearance between the sparge pipe and the glass. Instead, the sparge pipe depends downwardly from the mounting shaft 42, and the mounting shaft is pivotably attached to the frame 32 by means of the cuffs 44. In the event that greater clearance is needed between the sparge pipe and the glass, operators may grasp and turn the ends of the gas supply tubes 60 extending outwardly through the walls of the annealing lehr. Turning the gas supply tubes will cause the mounting shaft to rotate within the cuffs, rotating the sparge pipe 50 upwardly toward the frame and away from the glass. Once the operating malfunction is fixed and the float line is operating within normal parameters again, the sparge pipe may be lowered into the positions shown in FIGS. 1–3 to apply $SO_3$ to the glass.

As noted above, the $SO_3$ hood 30 in accordance with the invention includes an enclosure 70 which defines an interior space 72. The enclosure 70 should be sized to enclose the entire $SO_3$ supply system 40 (with the exception of the gas supply tubes 60 which extend outwardly of the lehr) and should extend downwardly to a position immediately adjacent the upper surface 27 of the glass. This will help maintain a relatively consistent, high concentration of $SO_3$ within the interior space so that an efficacious amount of $SO_3$ can be readily applied to the upper surface of the glass even if the glass is moving quite rapidly through the lehr.

The enclosure 70 may be formed of any suitable material but desirably is not formed of a rigid or highly abrasive material. If a rigid or abrasive material were used, any slight contact between the enclosure and the glass ribbon 25 would destroy the upper surface of the glass, making the glass unsalable. In a particularly preferred embodiment, this enclosure is formed of a fabric capable of withstanding the necessary operating temperatures. One fabric which has been found to work quite well is Refrasil™ cloth, a refractory silica cloth which is commercially available from Hitco of Gardena, Calif., U.S.A.

The Refrasil™ cloth forming the enclosure 70 can simply be bolted to the upstanding wall 38 extending about the periphery of the frame. Refrasil™ cloth has been found to hang downwardly and provide a suitable skin to define the interior space 72 without any added weight. If added weight were necessary, though, a series of weights 74 could be affixed to the cloth to make sure that it hangs properly, as illustrated schematically in FIG. 1. If such weights are used, care should be taken to ensure that the weights are not positioned at the bottom edge of the cloth, as this will tend to mar the upper surface of the glass. Instead, such weights should be affixed to the cloth at location spaced upwardly away from the glass.

The position of the hood 30 along the length of the lehr can be varied as desired. For instance, if sulfur trioxide is initially supplied to the supply tubes 60, the $SO_3$ application can take place at a lower temperature, e.g. on the order of about 500° C., and the hood can be positioned in a cooler portion of the lehr disposed further downstream from the tin bath 10. However, higher temperatures are generally preferred as the reaction tends to proceed more rapidly at higher temperatures.

If a combination of $SO_2$ gas and an oxygen-containing gas is supplied to the $SO_3$ supply system 40, however, the hood should be located within the lehr at a location where the temperature is sufficient to promote the efficient conversion of the sulfur dioxide to sulfur trioxide. As noted above, it is believed that the temperature necessary to promote efficient oxidation of sulfur dioxide is at least about 800° F., so the hood should be positioned at a location in the lehr where the ambient temperature is at least about 800° F., and it is desirably significantly higher so that the gas will reach the necessary reaction temperature relatively quickly and need not have a very long dwell time in the supply system 40 or the hood 30. For instance, the hood 30 of the present invention can be positioned within the lehr at a location where the ambient temperature is between about 1100° F. and about 1200° F. (about 600°–650° C.).

In selecting a position for the hood, a number of factors, including the practicality of installing the hood at a given location, should be considered. However, as a general rule, the closer the hood is positioned to the exit of the tin bath, the better. If so desired, the hood could most likely be placed in the enclosure of the tin bath itself and still yield acceptable glass. However, this presents a number of practical difficulties that can be avoided by placing the hood in the lehr rather than in the tin bath itself.

For instance, placing the hood in the tin bath could introduce oxygen into the tin bath enclosure. It has been well recognized in the art that an oxidizing atmosphere is undesirable in the tin bath as this will adversely affect the molten tin. In order to avoid this problem, the hood would have to be designed to ensure that little or no gas can escape from the hood into the atmosphere of the tin bath. Accordingly, the hood is desirably positioned in the enclosure of the annealing lehr rather than in the tin bath, but it is to be understood that a hood of the invention could instead be placed in the tin bath enclosure.

By placing the hood at the beginning of the lehr, the temperature will be maximized, which helps promote the reaction to form the $SO_3$ coating, as noted above. Furthermore, applying the coating as early as possible in the lehr will limit the time that unprotected glass is subject to moisture attack in the lehr. Accordingly, it is deemed best to place the hood as close to the beginning of the lehr (i.e. as close to the exit of the tin bath) as the structure of the lehr and other practical considerations will allow without incurring undue installation and maintenance costs.

Glass having an upper surface 27 treated with sulfur trioxide in accordance with the present invention has exhibited surprisingly good stain resistance. When $SO_3$ treatment of the upper side of the glass according to this invention was employed in a production setting, no staining was observed. Preliminary results indicate that $SO_3$ treatment in accordance with the present invention used alone, i.e without an additional acid treatment, will provide stain resistance superior to any of the current manufacturing techniques involving the application of acid to the upper surface of the glass.

In one experimental model, three slightly different samples of glass were prepared. Each of the three samples started with a soda-lime silicate float glass, i.e. a sheet of glass which had been prepared using a float bath such as described above. The three samples of glass differed, though in the treatment of their surfaces with $SO_2$ (or $SO_3$).

The first of the three samples of glass in the experiment was prepared by the normal float process noted above wherein the bottom surface of the glass (i.e. the surface previously in contact with the tin bath) was treated with a gas which contained sulfur dioxide, generally as outlined above. This glass is referred to as "Type I" glass. The second sample of glass ("Type II" glass) was produced without exposure to the $SO_2$ environment. The third and final sample ("Type III" glass) was prepared by placing a Type II glass in an oven maintained at about 500° C. and introducing sulfur dioxide gas into the oven. The sulfur-containing environment was allowed to contact both the top and bottom surfaces of the glass.

All three of these types of glass were rinsed with distilled water, dried and subjected to an artificial weathering process. In this process, the samples were placed in an enclosed glass container which contained a reservoir of distilled water; the samples were not in physical contact with the liquid water in the reservoir. This enclosed container was then placed in a temperature controlled oven which was maintained at about 50° C. This yielded an atmosphere having a high water vapor concentration, which was believed to be in the neighborhood of about 98% relative humidity. The samples were held in this glass container in the temperature controlled oven for about two weeks before being removed for visual evaluation. This process is analogous to that set forth by Walters and Adams in "Effects of Humidity on the Weathering of Glass", *J. Non-Crystalline Solids*, Vol. 19, pp 183–199 (1975), the teachings of which are incorporated herein by reference.

The samples were inspected and evaluated for weathering resistance in a manner substantially the same as set forth by Walters and Adams. In essence, this process simply involves visual inspection of the glass and determining the degree of staining both under ambient light and under a concentrated beam light source. The Type II glass exhibited the poorest results, with a haze fairly evenly distributed over almost the entire sample being visible without a concentrated beam light source. The Type I glass did not fare much better than the Type II glass. Although it did have a slightly better appearance in that the haze was not as uniform as on the Type II glass, it nonetheless exhibited substantial haze. Both of these glasses could likely be classified as having "Poor" to "Very Poor" weathering resistance under the criteria established by Walters and Adams.

The Type III glass, i.e. glass having both surfaces treated with $SO_2$, yielded substantially better results than either the Type I or the Type II glass. There was no visible haze on the Type III glass and the surface was nearly free of even small visible spots. This glass would be rated as either "Excellent" or "Good" under the classification scheme of Walters and Adams. Thus, glass manufactured in accordance with the present invention would be expected to exhibit superior stain resistance to either totally untreated glass or glass having the under side treated with $SO_2$ to reduce roller abrasion in accordance with common commercial practice.

Using the $SO_3$ treatment of the invention could thus permit a manufacturer to completely eliminate the acid treatment step and the apparatus used to apply that acid. As these acids can be relatively difficult to handle, this can greatly simplify the manufacturing process and eliminate the maintenance difficulties associated with the acid application equipment.

Although $SO_3$ treatment in accordance with the present invention has proved to yield superior stain resistance, the exact mechanism by which this stain resistance is achieved is not fully understood at this time. We speculate that $SO_3$ reacts with sodium ions or sodium oxide in the surface of the glass to form a coating of sodium sulfate ($Na_2SO_4$), and that this is likely a constituent of the white, cloudy film that is formed on the glass surface. When float glass is washed in preparation for a further manufacturing operation such as coating the glass with a metal oxide heat reflective film, the water soluble sodium sulfate is readily washed away without requiring any additional equipment or manufacturing steps.

It has been hypothesized that the process of the invention leaves a glass surface which is silica-rich, i.e. is poor in sodium and other lattice modifying ions, and such a silica-rich surface is less subject to ionic attack than a standard glass surface. Preferably, enough $SO_3$ gas is applied to the glass surface to result in the formation on the glass of a light, powdery deposit that is visible to the naked eye.

It should be understood that the exact nature of the interaction between the $SO_3$ and the upper surface of the glass is not fully understood. The explanation set forth in the preceding paragraph is simply offered as a possible explanation of the superior results which have been obtained in accordance with the present invention.

While a preferred embodiment of the present invention has been described, it should be understood that various changes, adaptations and modifications may be made therein without departing from the spirit of the invention and the scope of the appended claims.

What is claimed is:

1. In a float glass production apparatus in which float glass has an upper surface, an apparatus for applying $SO_3$ gas to the upper surface of the float glass including a downwardly open hood comprising a frame positioned above the upper surface of the glass, a mounting shaft pivotably carried by the frame and walls depending from the frame to define an enclosure, a supply of $SO_3$ gas, and a delivery tube in communication with the $SO_3$ supply and positioned within the enclosure for delivery of $SO_3$ gas to the upper surface of the glass, the delivery tube comprising a sparge pipe attached to the mounting shaft and rotatable therewith.

2. The apparatus of claim 1 wherein the sparge pipe is pivotable with the mounting shaft between a first position wherein it depends generally vertically downwardly from the mounting shaft and a second position wherein it is disposed away from vertical and is spaced away from the upper surface of the float glass.

3. The apparatus of claim 1 wherein the sparge pipe is divided into two substantially equal lengths and wherein the two lengths of the sparge pipe are each provided with a gas supply.

4. The apparatus of claim 1 wherein the hood is positioned in an annealing lehr.

5. An apparatus for the production of float glass in which float glass is horizontally supported and has an exposed upper surface, which apparatus comprises a supply of $SO_3$ gas; a downwardly open hood positioned in an annealing lehr at a location disposed above the upper surface of the float glass, the hood comprising a frame, walls depending from the frame and a mounting shaft rotatably carried by the frame; and a sparge pipe in communication with the $SO_3$ supply, the sparge pipe being positioned within the hood and attached to the mounting shaft for rotation therewith and being adapted to deliver $SO_3$ gas to the hood for delivery of said gas to the upper surface of the glass.

6. The apparatus of claim 5 wherein the sparge pipe is rotatable with the mounting shaft between a first position wherein it depends generally vertically downwardly from the mounting shaft and a second position wherein it is disposed away from vertical and is spaced away from the surface of the float glass.

7. The apparatus of claim 5 wherein the sparge pipe is divided into two substantially equal lengths and wherein the two lengths of the sparge pipe are each provided with a gas supply.

* * * * *